United States Patent
Nehru

(10) Patent No.: US 11,303,942 B2
(45) Date of Patent: Apr. 12, 2022

(54) SYSTEM AND METHOD FOR HANDLING VIDEO DATA

(71) Applicant: DISGUISE TECHNOLOGIES LIMITED, London (GB)

(72) Inventor: Ashraf Nehru, London (GB)

(73) Assignee: DISGUISE TECHNOLOGIES LIMITED, London (GB)

( * ) Notice: Subject to any disclaimer, the term of this patent is extended or adjusted under 35 U.S.C. 154(b) by 4 days.

(21) Appl. No.: 16/879,052

(22) Filed: May 20, 2020

(65) Prior Publication Data

US 2020/0359069 A1 Nov. 12, 2020

Related U.S. Application Data

(62) Division of application No. 15/565,738, filed as application No. PCT/GB2016/051048 on Apr. 14, 2016, now Pat. No. 10,764,612.

(30) Foreign Application Priority Data

Apr. 14, 2015 (GB) ...................................... 1506328
Oct. 2, 2015 (GB) ...................................... 1517475

(51) Int. Cl.
*H04N 21/2343* (2011.01)
*H04N 7/015* (2006.01)
(Continued)

(52) U.S. Cl.
CPC ..... *H04N 21/234363* (2013.01); *G09G 5/006* (2013.01); *G09G 5/363* (2013.01);
(Continued)

(58) Field of Classification Search
None
See application file for complete search history.

(56) References Cited

U.S. PATENT DOCUMENTS 6,243,706 B1 6/2001 Moreau et al.
2002/0122515 A1 9/2002 Bodenschatz
(Continued)

FOREIGN PATENT DOCUMENTS

CN 103957374 A 7/2014
EP 2725482 A1 4/2014
(Continued)

OTHER PUBLICATIONS

Press Release d3 4×4 Pro, Novatech Creative Event Technology, Mar. 11, 2015 (Mar. 11, 2015), p. 5PP, XP002758275.
(Continued)

*Primary Examiner* — Justin E Shepard
(74) *Attorney, Agent, or Firm* — Lando & Anastasi, LLP

(57) ABSTRACT

A video processor card for outputting video data, the video processor card being arranged for insertion into a video media server and into communication with an output of the video media server, the card comprising: an input for receiving a first video data stream at a first video resolution from the output of the video media server; a processor arranged to demultiplex the received first video data stream at the first resolution into a plurality of second video data streams, each second video data stream being at a second video resolution; and a plurality of video outputs, each video output arranged to output one of the plurality of second video data streams, wherein the first video resolution is at a higher video resolution than the second video resolution.

13 Claims, 8 Drawing Sheets

(51) Int. Cl.
*H04N 21/2365* (2011.01)
*H04N 7/08* (2006.01)
*G09G 5/391* (2006.01)
*G09G 5/00* (2006.01)
*G09G 5/36* (2006.01)
*G09G 5/397* (2006.01)

(52) U.S. Cl.
CPC .............. *G09G 5/391* (2013.01); *G09G 5/397* (2013.01); *H04N 7/015* (2013.01); *H04N 7/0806* (2013.01); *H04N 21/2343* (2013.01); *H04N 21/2365* (2013.01); *G09G 2340/0407* (2013.01); *G09G 2360/02* (2013.01); *G09G 2360/08* (2013.01); *G09G 2370/022* (2013.01); *G09G 2370/12* (2013.01)

(56) References Cited

U.S. PATENT DOCUMENTS

| | | | |
|---|---|---|---|
| 2005/0039219 | A1 | 2/2005 | Cooper et al. |
| 2008/0211816 | A1* | 9/2008 | Gonzalez .................. G06F 3/14 345/505 |
| 2009/0240862 | A1* | 9/2009 | Chen ...................... G06F 13/409 710/301 |
| 2009/0284620 | A1 | 11/2009 | Lablans |
| 2011/0274155 | A1* | 11/2011 | Noh ...................... H04N 19/587 375/240.01 |
| 2014/0168512 | A1 | 6/2014 | Suh et al. |

FOREIGN PATENT DOCUMENTS

| | | |
|---|---|---|
| JP | H4212193 A | 8/1992 |
| JP | H7152900 A | 6/1995 |
| JP | 2006-92334 A | 4/2006 |
| JP | 2009130639 A | 6/2009 |
| JP | 2010251920 A | 11/2010 |
| JP | 201337670 A | 2/2013 |
| KR | 10-2014-0085749 A | 7/2014 |

OTHER PUBLICATIONS

Office Action in corresponding European Patent Application No. 16717692.4 dated Sep. 22, 2020.
Office Action in Japanese Patent Application No. 2017-554514 dated Jun. 5, 2020.

* cited by examiner

SYSTEM AND METHOD FOR HANDLING VIDEO DATA

CROSS-REFERENCE TO RELATED APPLICATIONS

This application claims priority under 35 U.S.C. § 121 as a Divisional of U.S. Application No. 15/565,738, filed Oct. 11, 2017, which claims priority under 35 U.S.C. § 371 as a U.S. National Stage Application of International Application No. PCT/GB2016/051048, filed Apr. 14, 2016, which claims the benefit of United Kingdom Application No.1517475.8, filed Oct. 2, 2015, and United Kingdom Application No. 1506328.2, filed Apr. 14, 2015, each of which is incorporated herein by reference in its entirety for all purposes.

TECHNICAL FIELD

The present invention relates to a system and method for handling video data. In particular, the invention relates to transmitting multiple lower-resolution video signals via an infrastructure capable of supporting the transmission of a relatively higher resolution video signal.

BACKGROUND

Although the current HD video standard (1920×1080 pixels) remains prevalent, in recent years, the 4K video standard (up to 4096×2160 pixels) has gained in popularity. The latest generation of media servers contain modern graphics processor units (GPUs) which are capable of outputting multiple streams of 4K video. Whilst the new generation of monitors and projectors are increasingly capable of displaying 4K video, and the uptake of 4K video in conventional video streaming sites (for example, YouTube, Vimeo and Netflix) has also increased in the last few years, the dominant standard in the video and media industry remains the current HD video standard. In particular, many professional users in the industry have not incurred the expense of substituting their HD output systems (e.g. displays and projectors) with those capable of supporting the 4K video standard.

It is to be noted that although the industry retains a lot of HD projection and signal transmission/switching gear, this is not because 4K is inherently difficult to transmit, but because of the large investments that have been made to date.

In the years to come, the 4K video standard will likely experience a huge increase in popularity and it will become necessary for consumers and for the video industry as a whole to upgrade their systems in order to be compatible with 4K video. In the move from HD to 4K, they would need to reinvest in media servers/players.

However, in the meantime, there are problems associated with the implementation of 4K standards in the video industry, particularly in relation to difficulties associated with transmitting 4K video signals over long distances (more than 2-3 m) using conventional means. Therefore, despite the promise of higher resolution compared to conventional HD video, 4K video has not been readily taken up across the video industry.

Many users have therefore retained their HD-compatible systems, and have not yet invested in 4K-compatible technologies; 4K systems are not necessarily back-compatible and do not easily support transmission and display of the lower-resolution HD signals via the conventional hardware already owned by many users.

However, in the long-term, the retention of HD-compatible systems may not be particularly cost effective. Furthermore, some users may effectively end up paying twice—first to invest in the most up-to-date HD-compatible systems and then within a few years when 4K standards become more widely used, users will need to upgrade their HD systems to 4K-compatible systems.

Although the current HD video standard (1920×1080 pixels) remains prevalent, in recent years, the 4K video standard (up to 4096×2160 pixels) has gained in popularity. The latest generation of media servers contain modern graphics processor units (GPUs) which are capable of outputting multiple streams of 4K video. Whilst the new generation of monitors and projectors are increasingly capable of displaying 4K video, and the uptake of 4K video in conventional video streaming sites (for example, YouTube, Vimeo and Netflix) has also increased in the last few years, the dominant standard in the video and media industry remains the current HD video standard. In particular, many professional users in the industry have not incurred the expense of substituting their HD output systems (e.g. displays and projectors) with those capable of supporting the 4K video standard.

As a result, there is a mismatch between the capabilities of the GPUs built into media servers (capable of 4K) and the downstream video distribution and projection systems (capable of HD). This results in underuse of the GPU's capabilities, with each of its 4K-capable outputs serving only HD resolution, one-quarter of its actual capacity.

As both the GPU industry and the live video industries evolve on different timetables, this mismatch is expected to continue, as the GPU industry graduates to 8K resolutions while the video industries graduate to 4K.

For this reason, the industry has spawned technologies designed to interface between the 4K output capabilities of GPUs, and the HD signal distribution and display equipment that the industry retains.

Such technologies are typically implemented as stand-alone processing devices that receive a high-resolution video stream from the GPU, and break it up into multiple lower-resolution streams for transmission to video devices.

However, this creates a significant burden on the operators of this equipment, in terms of cost, complexity, equipment volume, reliability, setup time and management overhead.

It is against this background that the present invention has been devised.

SUMMARY OF INVENTION

According to an aspect of the present invention, there is provided a video processor card for outputting video data, the video processor card being arranged for insertion into a video media server and into communication with an output of the video media server, the card comprising: an input for receiving a first video data stream at a first video resolution from the output of the video media server; a processor arranged to demultiplex the received first video data stream at the first resolution into a plurality of second video data streams, each second video data stream being at a second video resolution; and a plurality of video outputs, each video output arranged to output one of the plurality of second video data streams, wherein the first video resolution is at a higher video resolution than the second video resolution.

It should be noted that the plurality of second video data streams may correspond to a plurality m, and the plurality of video outputs may correspond to a further plurality n, where n is greater than or equal to m. In other words, there is not necessarily a one-to-one correspondence between second video data streams and video outputs, and there may be more video outputs than second video data streams.

Advantageously, the video processor card configuration as described above provides the capability to demultiplex a single high resolution input video data stream into multiple low resolution output video data streams, which can subsequently be output to projectors for public display. When in use in a media server, the video processor card ensures that the output of the media server is compatible with the capabilities of the signal transmission or projection equipment. For example, this is useful in situations where the media server is capable of processing 4K resolution video data, but the signal transmission equipment is only able to transmit HD resolution video data.

Furthermore, the video processor card removes the need for the media server itself to demultiplex an initial video data stream into the requisite form for output. When the properties of the input or output video data streams are changed, it is therefore cheaper and easier to adapt a system incorporating the above video processor card, as only the video processor card will need to be replaced or upgraded, rather than necessitating replacement or upgrade of the entire media server.

Optionally, the video processor card is a video format conversion card. This ensures that the video processor card is able to convert the video format of the input video data stream into an output format as desired by the user.

Optionally, the first video data stream at the first video resolution comprises the plurality of second video data streams interleaved together.

Advantageously in the above scenario, the first video data stream which is input to the video processor card already comprises the second video data streams that are required to be output. This means that the video processor card does not need to be equipped with the ability to carry out complex processing on the input video data stream, as all the data required for output is already present. The video processor card is therefore simple and cheap to manufacture.

Optionally, the first and second video data streams comprise pixel data. Consecutive pixels in the first video data stream may comprise pixel data from different ones of the plurality of second video data streams. The processor may be arranged to demultiplex the received first video data stream such that all the pixel data relating to one of the plurality of second video data streams is sent to one of the plurality of video outputs.

The above configuration has the advantage of optimally ordering the pixels in the input video data stream for easy demultiplexing into multiple output data streams. In particular, where consecutive pixels of the input stream comprise pixel data intended for different output data streams, the received pixels may be immediately output via one of the plurality of video outputs. Such configurations remove the need to process or store any of the incoming data, and hence allow output of multiple data streams simultaneously without requiring a latency period to read and buffer a full frame. This is particularly advantageous in situations where real-time update or output is required.

Optionally the first video resolution is 4K resolution and the second video resolution is HD resolution. Alternatively, the first video resolution may be 8K resolution and the second video resolution may be 4K resolution.

Advantageously, the above configuration of the video processor card provides the flexibility to handle the incompatibility between the capabilities of the media server and other signal generating equipment, and the capabilities of the projection and single transmission equipment. Current incompatibilities, between 4K resolution input data from the media server and output to the HD signal transmission equipment, are addressed by a video processor card that converts video data from 4K to HD resolution. In the future, when the media server generates higher resolution video data (e.g. 8K resolution), whilst the signal transmission equipment only remains capable of handling lower resolution data (e.g. 4K resolution), simply upgrading the video processor card capabilities to convert 8K resolution data to 4K resolution data will address the incompatibilities, without requiring the entire media server or all of the signal transmission equipment to be upgraded.

Optionally, the video processor card comprises an encoder for encoding the second video data streams into a specific video format. The specific video format may be DVI, or 3G-SDI.

The above configuration of a video processor card which incorporates a video format encoder is useful in situations where the video processor card may be required to output video data in many different formats, each with different requirements.

According to another aspect of the present invention, there is provided a media server for generating a first video data stream at a first video resolution and outputting video data to video display devices, the media server comprising: an input for receiving a plurality of source video data streams at a source video resolution; a video processor card slot for receiving removable video processor cards; a processor arranged to interleave pixels of the second video data streams received at the input in order to generate the first video data stream; an output arranged to output the first video data stream to the video processor card slot.

Advantageously in the above configuration, the media server interleaves pixel data from multiple video data streams (which are each intended to be output separately from the video processor card) and passes the resultant video data stream to the video processor card. This means that the pixel data for the multiple output video data streams is presented in an optimal order to the video processor card—specifically, in the order in which each pixel will need to be read and output to the signal transmission equipment. Therefore, the processing power and storage capacity of the video processor card may be reduced as does not need to buffer or process any of the incoming data before the data is demultiplexed and output for the signal transmission. This makes the video processor cards cheaper and easier to produce and replace.

Optionally, the media server comprises a second video data stream at a second video resolution.

Advantageously, a media server with the above configuration would be able to handle the processing of an additional video data stream. In particular, the second video data stream could comprise a source video (at a specific source video resolution) that is provided to (or generated by) the media server for subsequent processing before it is output via the video processor card. For example, this would be useful in scenarios where a particular source video data stream at a very high resolution (greater than 4K resolution) may be received by the media server, with the intention of different regions of the source video frames to be rendered into separate 4K or HD resolution video data streams.

The video processor card slot of the media server may comprise a video processor card such that the media server outputs a plurality of second video data streams at the second video resolution.

The above configuration advantageously combines the functionalities of the video processor card and the media server, allowing the data processed by the media server to be demultiplexed into multiple output video data streams of a different resolution to the initial data streams, for compatibility with signal transmission and/or projection equipment.

Optionally, the video processor card slot of the media server comprises a pass-through video processor card, the pass-through video processor card being arranged to receive the first video data stream at an input of the video processor card, and to pass the first video data stream through to a video processor card output.

The incorporation of a video processor card with a pass-through functionality allows the video processor card to simply pass the input video data stream (received from the media server) straight to the output, without requiring any demultiplexing to be carried out. This is advantageous in situations where there is no mis-match between the capabilities of the media server and the signal transmission and/or projection equipment. For example, when the signal transmission equipment has been upgraded to handle 4K resolution video data, and there is no longer any need for the 4K video data to be split up into multiple HD video streams for transmission and projection purposes. In this case, the media server itself does not need to be upgraded, all that is required is to exchange a demultiplexing video processor card for a pass-through video card—this is a much cheaper and easier solution.

Optionally, the media server comprises at least two video processor card slots. The processor may be arranged to generate at least two first video data streams, each first video data stream being sent to a different video processor card slot.

Advantageously, the media server in the above configuration can handle multiple input video data streams (e.g. at least two 4K resolution video data streams), and can pass each input stream to a different video processor card for simultaneous output. This effectively increases the number of video data streams that may be output from a single media server without requiring any substantial change to the functionality or configuration of the media server itself.

A method of outputting video data, the method comprising: receiving, at an input, a first video data stream at a first video resolution from the output of a video media server; demultiplexing the first video data stream into a plurality of second video data streams, each second video data stream being at a second video resolution; and outputting video data from a plurality of video outputs, each video output being arranged to output one of the plurality of second video data streams, wherein the first video resolution is at a higher video resolution that the second video resolution.

A carrier medium for carrying a computer readable code for controlling a computing device to carry out the above-described method.

A method of generating a first video data stream at a first video resolution and outputting video to video display devices, the method comprising: receiving, at an input, a plurality of source video data streams at a source video resolution; interleaving pixels of the source video data streams in order to generate the first video data stream; and outputting the first video data stream to a video processor card slot for receiving removable video processor cards.

A carrier medium for carrying a computer readable code for controlling a computer device to carry out the above-described method.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF DRAWINGS

Preferred embodiments of the present invention are described below with reference to the appended figures, in which.

The figures laid out herein illustrate embodiments of the present invention but should not be construed as limiting to the scope of the invention. Where appropriate, like reference numerals will be used in different figures to relate to the same structural features of the illustrated embodiments.

DETAILED DESCRIPTION

Figure 1:
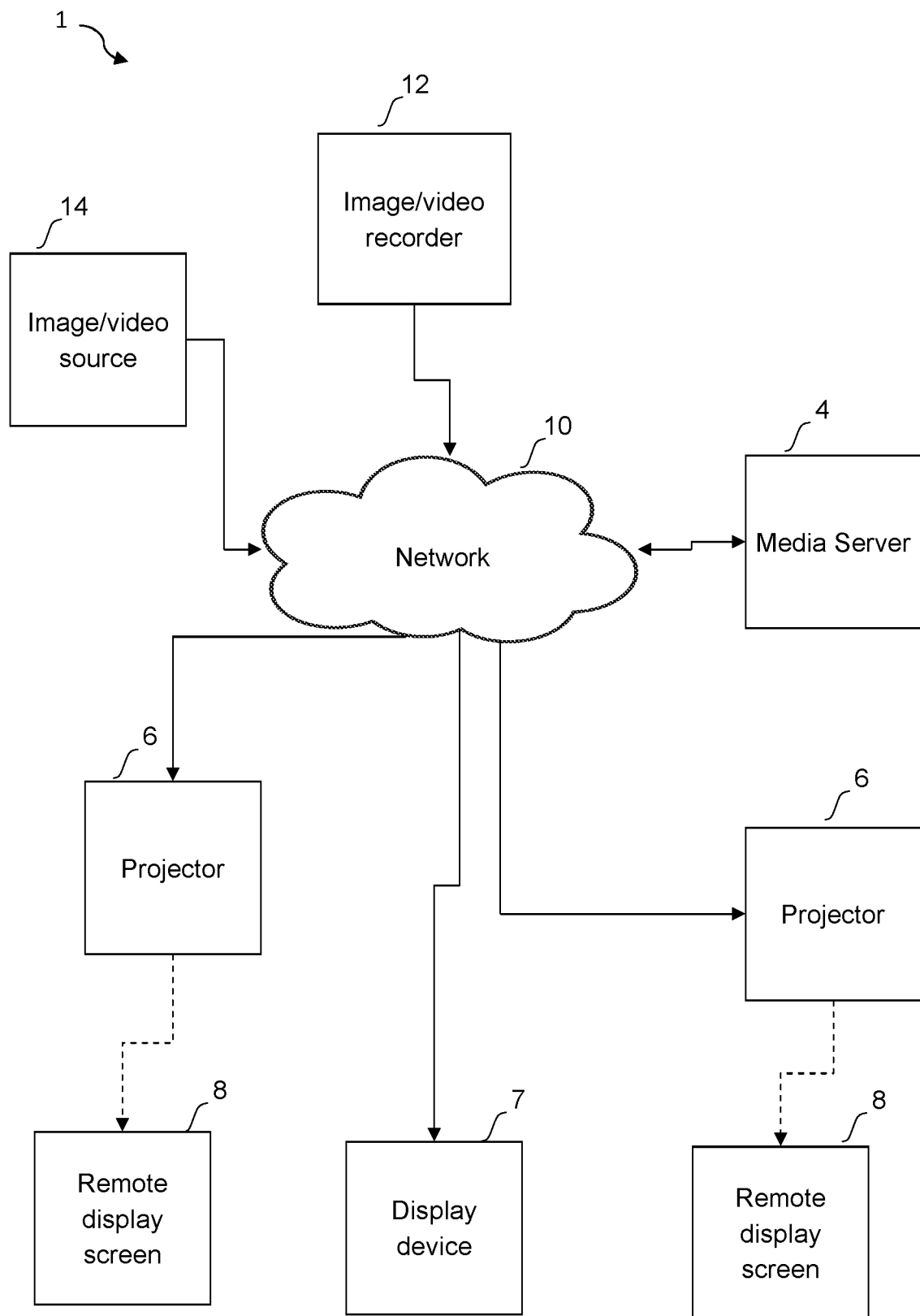
FIG. 1 is a schematic block diagram of an environment of a video data handling system carrying out processing and transmission of video data in accordance with an embodiment of the present invention.

FIG. 1 illustrates a video data handling system which is used to process and transmit video data streams in accordance with a first embodiment of the present invention.

The video data handling system 1 comprises a media server 4 for the processing and provision of video data streams to remote users of video projectors 6 for display on one or more remote display screen 8 or to a display device 7 (such as a plasma display). The interactions between the media server 4 and the one or more video projectors 6 are carried out using a network 10. In particular embodiments, video signals from the media server 4 are transmitted by video links (either DVI or SDI) to the one or more video projectors 6. The network 10 may comprise wireless or wired connection means, data transfer networks, video transfer networks, video distribution systems, or any combination thereof.

In some embodiments, the video data streams may be provided initially to the media server 4 by an image/video recorder 12. For example, in those cases where a live event is recorded and streamed to the media server 4 via the network 10 for post-processing and subsequent re-display. Other embodiments are also envisaged in which the video data streams are created by a separate image/video source 14, and provided to the media server 4 via the network 10. For example, the video data streams may be created by computers running authoring and post-production tools and provided to the media server 4 via the network 10. Alternatively, such embodiments could also be applied in situations where a pre-recorded event is projected onto the remote display screens 8, as accompaniment to a live event. In still other embodiments, the media server 4 may generate the video data itself using its internal graphical processing capabilities (not shown).

It will be appreciated that a combination of the above embodiments of video stream production may also be implemented using some or all of the components of the above system, depending on the requirements of the end user, and that such embodiments are deemed to fall within the scope of embodiments of the present invention.

Figure 2:
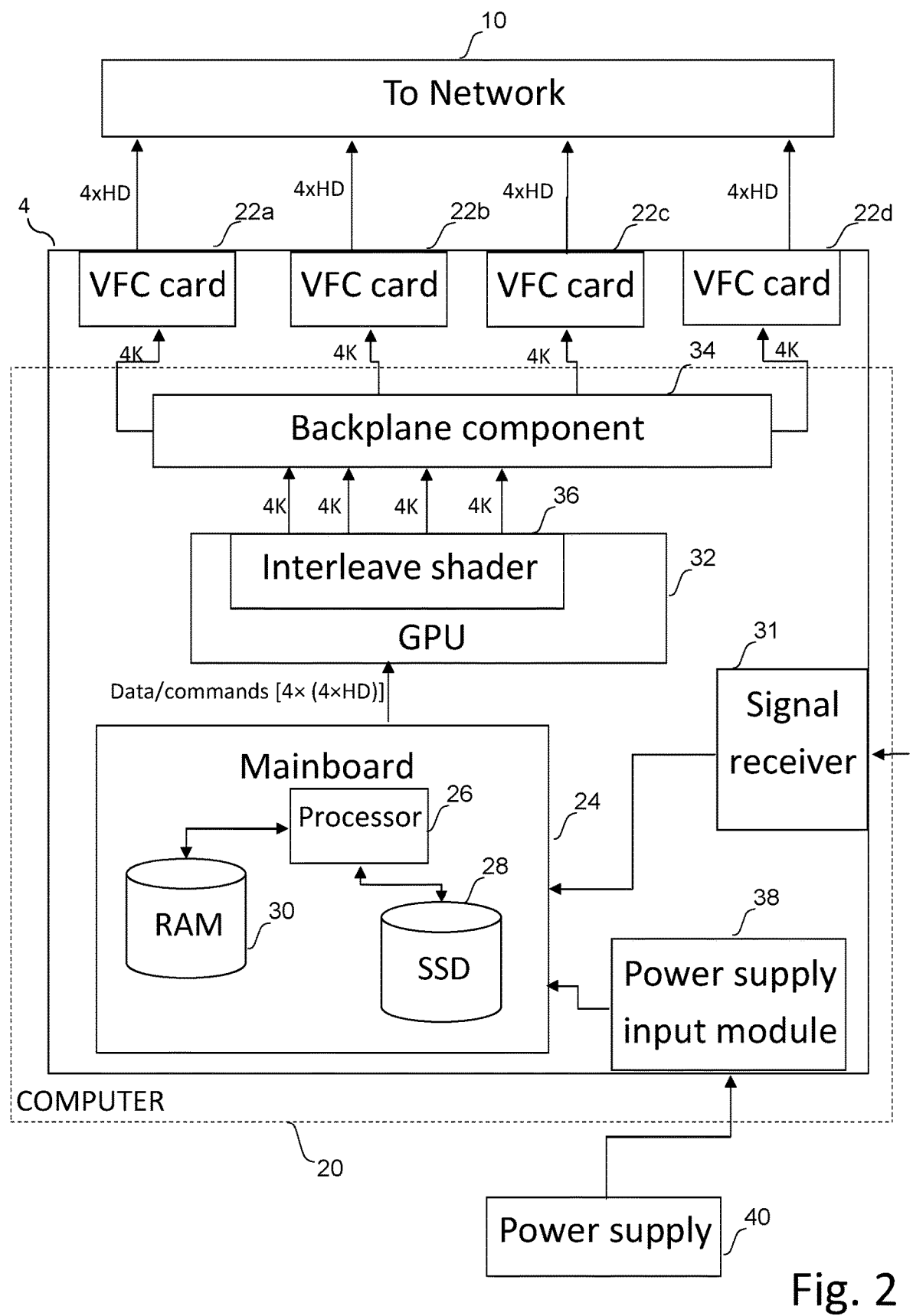
FIG. 2 is a schematic block diagram showing details of the components of the media server of FIG. 1.

FIG. 2 illustrates the main components comprised within the media server 4 according to an embodiment of the present invention, and the mechanism by which the video data streams are transmitted from the media server to the network.

In the specific embodiment shown in this figure, sixteen (i.e. four sets of four) initial low resolution (HD) video data streams are processed in the media server 4 and multiplexed (combined) to produce four higher resolution (4K) video data streams, which are subsequently demultiplexed (split up) to output the original sixteen low resolution video data streams in a format which is compatible with being transmitted via the network 10 and displayed on remote display screens 8, 8a.

It should be noted that the arrangement described here—taking 16 HD input video data streams to generate 4 4K output video data streams—is one example of an arrangement that may be adopted using the system embodiment of FIG. 2, and that other configurations of the media server system having different numbers and types of input and output video data streams would also be possible.

The media server 4 comprises a computer 20 in operative communication with four video processor cards/VFC (Video Format Conversion) cards 22a, 22b, 22c, 22d. A detailed breakdown of the components comprising the VFC cards will be provided later with reference to FIG. 3. It is noted that in alternative embodiments the computer 20 may be in operative communication with one or more video processor cards/VFC cards.

The computer 20 comprises a mainboard 24, which itself comprises the components of a standard computer including a processor 26, an SSD (Solid State Drive) 28 and a RAM (Random Access Memory) component 30. These components may be used in the production and storage of video data streams, in those embodiments where the media server 4 generates the video data streams itself and stores it within the SSD 28. In other embodiments where the media server 4 receives the video data streams from an image/video recorder 12 or an image/video source 14, the media server further comprises a signal receiver 31 which receives the data and transmits it to the mainboard 24 for initial processing and/or storage using the SSD 28 or the RAM 30.

The computer 20 further comprises a GPU (Graphical Processing Unit) 32 and a backplane component 34. The main function of the GPU 32 is to manipulate the input video data streams received from the mainboard 24 and create video data streams that are suitable for output to various display screens 8, 8a. An important component of the GPU 32 is the interleave shader 36 which, for each set of 4×HD video data streams, interleaves the pixels of the HD video streams to produce a single 4K video data stream that is subsequently output to the backplane component 34. As there are 16 input HD video streams (four sets of 4×HD streams) in the embodiment shown in FIG. 2, the output from the interleave shader 36 to the backplane component 34 is therefore 4 separate 4K video data streams. The backplane component 34 performs line re-driving on these 4K video streams to prevent signal degradation, and subsequently transmits each 4K video stream to a separate VFC card 22a-d. Each VFC card 22a-d splits up the input 4K video stream into four lower resolution HD video streams, and subsequently converts them into a desired format (e.g. DVI or 3G-SDI) for output to the network 10.

Finally, the media server 4 comprises a power supply input module 38 for obtaining power from a power supply 40 in order to allow the media server to function.

In certain embodiments, it is envisaged that the VFC cards 22a-d will take the form of physical cards which are slotted into specifically-designed receiving portions of the media server. In particular, the cards can be slotted into the backplane which is specifically-designed to receive them. The cards are designed to be easily removable from the media server, so that they may be removed and interchanged with other VFC cards having different video format conversion capabilities if required.

It is therefore possible to vary the format of the output video very easily by interchanging VFC cards, which is an advantage of embodiments of the present invention.

It should be noted that the number of VFC cards shown in FIG. 2 is not intended to be limiting. Depending on the requirements of the end-user, and consequently the amount of video data that needs to be processed and transmitted through the media server system, there may be a minimum of one VFC card, or as many as may be physically located within the media server without unduly impairing its functionality.

Alternative embodiments have been envisaged for future use when the industry standards have caught up with the hardware abilities, and 4K streams may be directly transmitted via the network 10. In such embodiments, VFC cards 22a-22d which split up the incoming 4K stream into multiple HD streams would be replaced with VFC cards that act as a 'pass through' for the 4K stream. The media server 4 would therefore not split the incoming 4K video streams up into multiple HD video streams, but would simply provide a means by which the 4K video stream could be encoded into the required format for the end-user, and then output the 4K video streams to the network 10.

Embodiments of the present invention therefore have the advantage of flexibility, as they have the ability to adapt to the ever-changing industry requirements with only minor modifications. Other current systems would need to change the entire media server in order to accommodate the changing needs of the industry.

Figure 3:
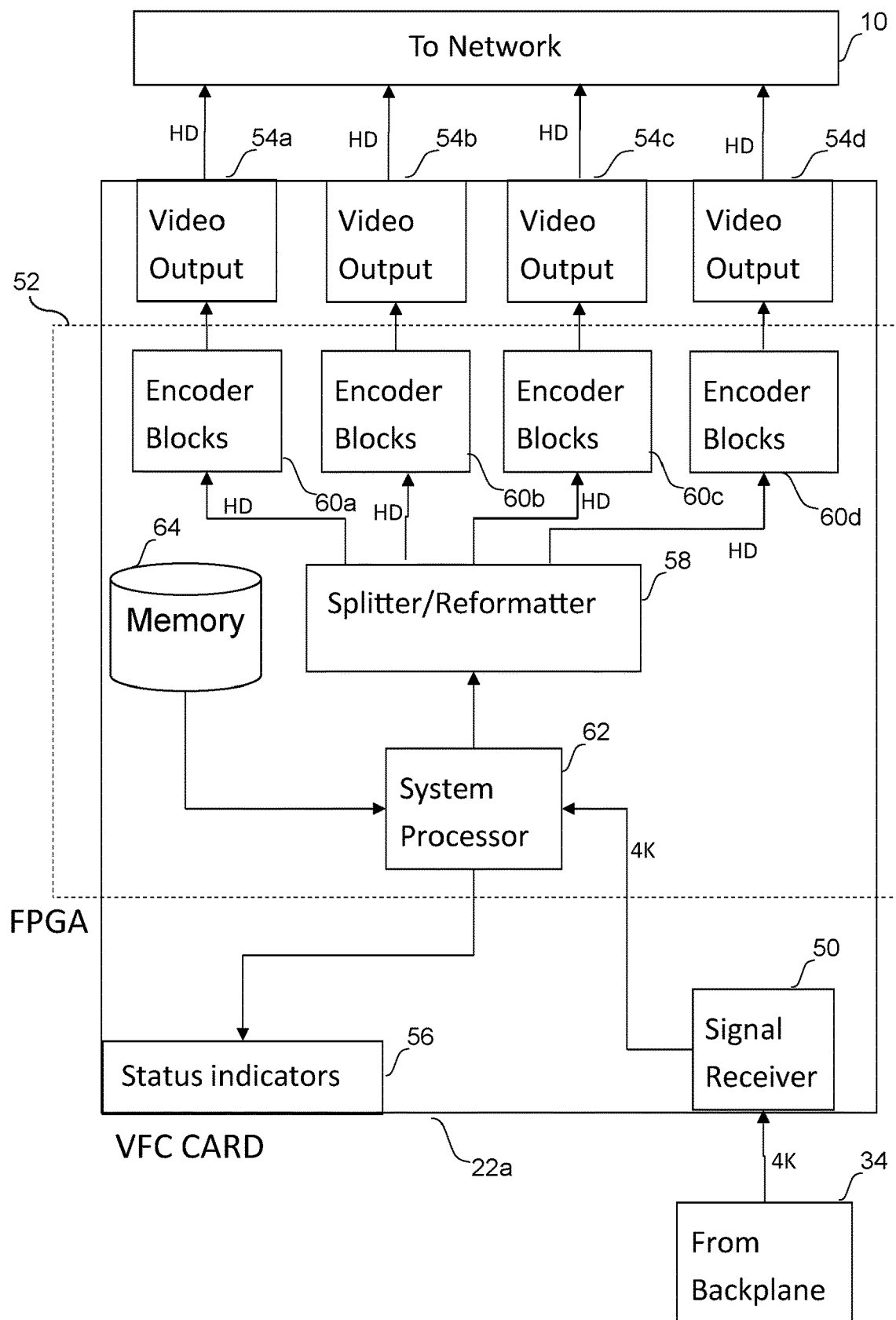
FIG. 3 is a schematic block diagram showing details of the components of the VFC card incorporated into the media server of FIG. 2.

A detailed breakdown of the components of one of the VFC cards 22a (shown in FIG. 2) is now provided with reference to FIG. 3.

The VFC card 22a comprises a signal receiver 50, FPGA (Field Programmable Gate Array) 52, a plurality of video outputs 54a, 54b, 54c, 54d, and (optionally) one or more status indicators 56. These status indicators may take the form of LED-type indicators, and may provide information indicating the status of the VFC card system by, for example, changing colour depending on whether the VFC card is currently outputting data to the network 10.

The FPGA 52 further comprises a splitter (reformatter) 58, in operative communication with a plurality of encoder blocks 60a, 60b, 60c, 60d, which are themselves operatively connected to the plurality of video outputs 54a, 54b, 54c, 54d. The FPGA 52 also comprises a processor 62 which connects to and controls all of the other components of the FGPA 52 (for example, the memory 64), performing setup, synchronisation and feedback tasks for the VFC card 22a.

The signal receiver 50 receives the incoming 4K video data stream transmitted from the backplane component 34, parses the data stream and then transmits it to the FPGA 52. This 4K video stream is received by the splitter 58, and is demultiplexed to produce 4 lower resolution HD video streams. Each HD video stream is subsequently passed to one of the plurality of encoder blocks 60a, 60b, 60c, 60d, which encode the video stream into the required output format (e.g. DVI or 3G-SDI). The resultant video streams are then output to the network 10 via one of the plurality of video outputs 54a-d.

Figure 4:
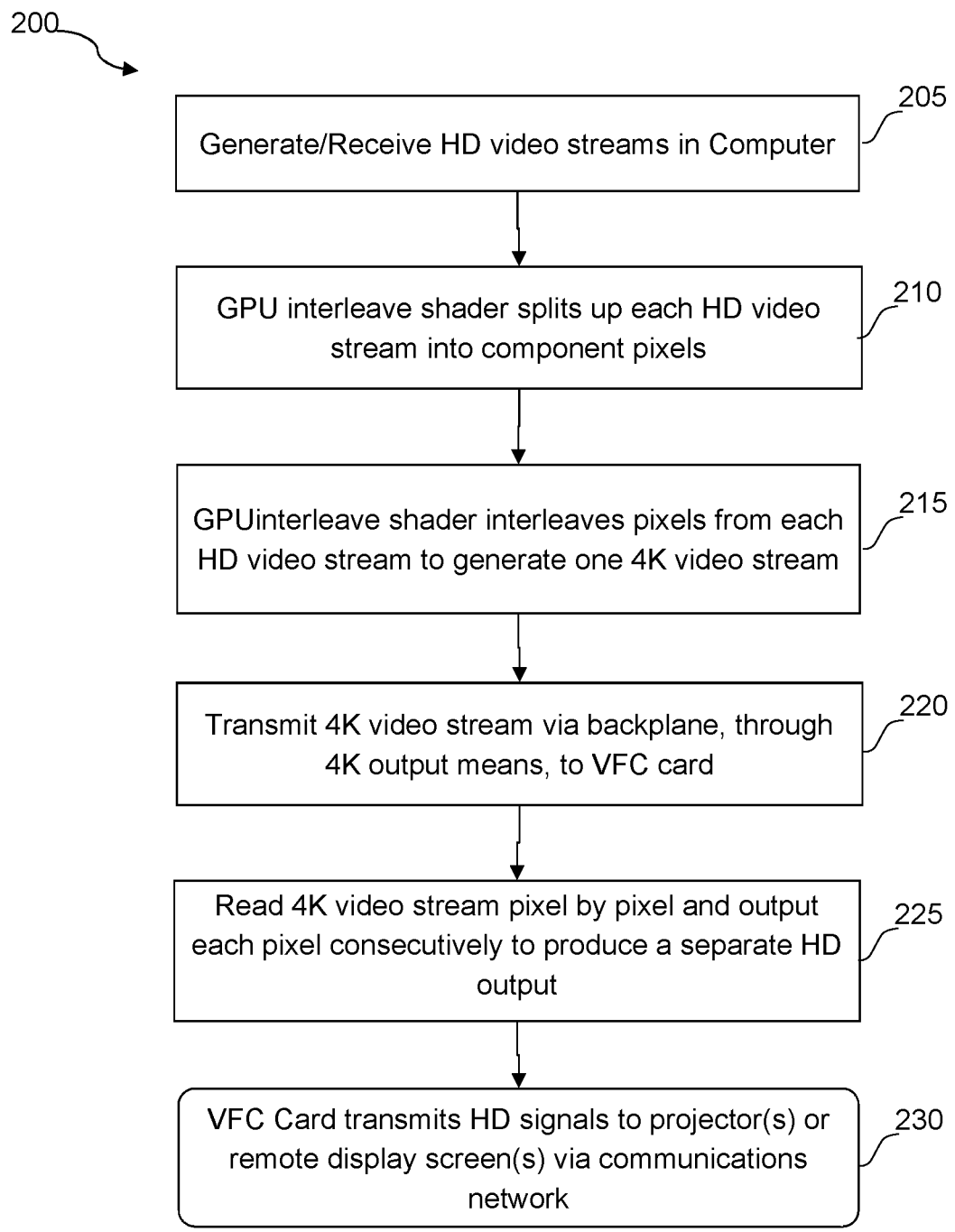
FIG. 4 is a flow diagram of a high-level process comprising the processing and transmission of video data in the system embodiment of FIG. 2.

The flow diagram of FIG. 4 illustrates the general process by which input HD video streams are processed and transmitted through the constituent components of the media server system embodiment shown in FIG. 2. This process will be described in further detail with reference to FIGS. 5-8.

For clarity purposes, the subsequent processes will be described with reference to a single VFC card 22a, wherein the initial input from the mainboard 24 comprises 4 HD video streams, which are combined into a single 4K video stream, and subsequently split into four HD video streams which are output from the VFC card 22a. However, it should be noted that this process may be mirrored by the other three VFC cards 22b, 22c, 22d which are shown in the system embodiment of FIG. 2, so that the final outputs from the media server system as a whole are 16 HD video streams.

The process 200 begins at Step 205, where the computer 20 retrieves from the mainboard 24 multiple HD video streams, which have either been generated by the computer itself, or have been obtained from an image/video recorder 12 or other source 14 via the network 10.

The HD video streams are then transferred to the interleave shader 36 of the GPU 32, which splits each HD stream up into its component pixels at Step 210, and interleaves these pixels to generate a single 4K video stream in Step 215. This is then transmitted in Step 220 from the GPU interleave shader 36, through the backplane component 34, to the VFC card 22a.

In the VFC card 22a, the 4K video stream is demultiplexed in Step 225 by the splitter 58, such that consecutive pixels in the 4K stream are read and allocated to alternate video outputs 54a-d in turn. In other words, the first pixel in the stream is allocated to the first video output 54a, the second pixel is allocated to the second video output 54b and so on, until the entire stream has been processed. In step 230, each of the video outputs 54a-d transmits their corresponding HD output via the network 10 to projector(s) 6, 6a for display on the remote display screen(s) 8, 8a.

Figure 5:
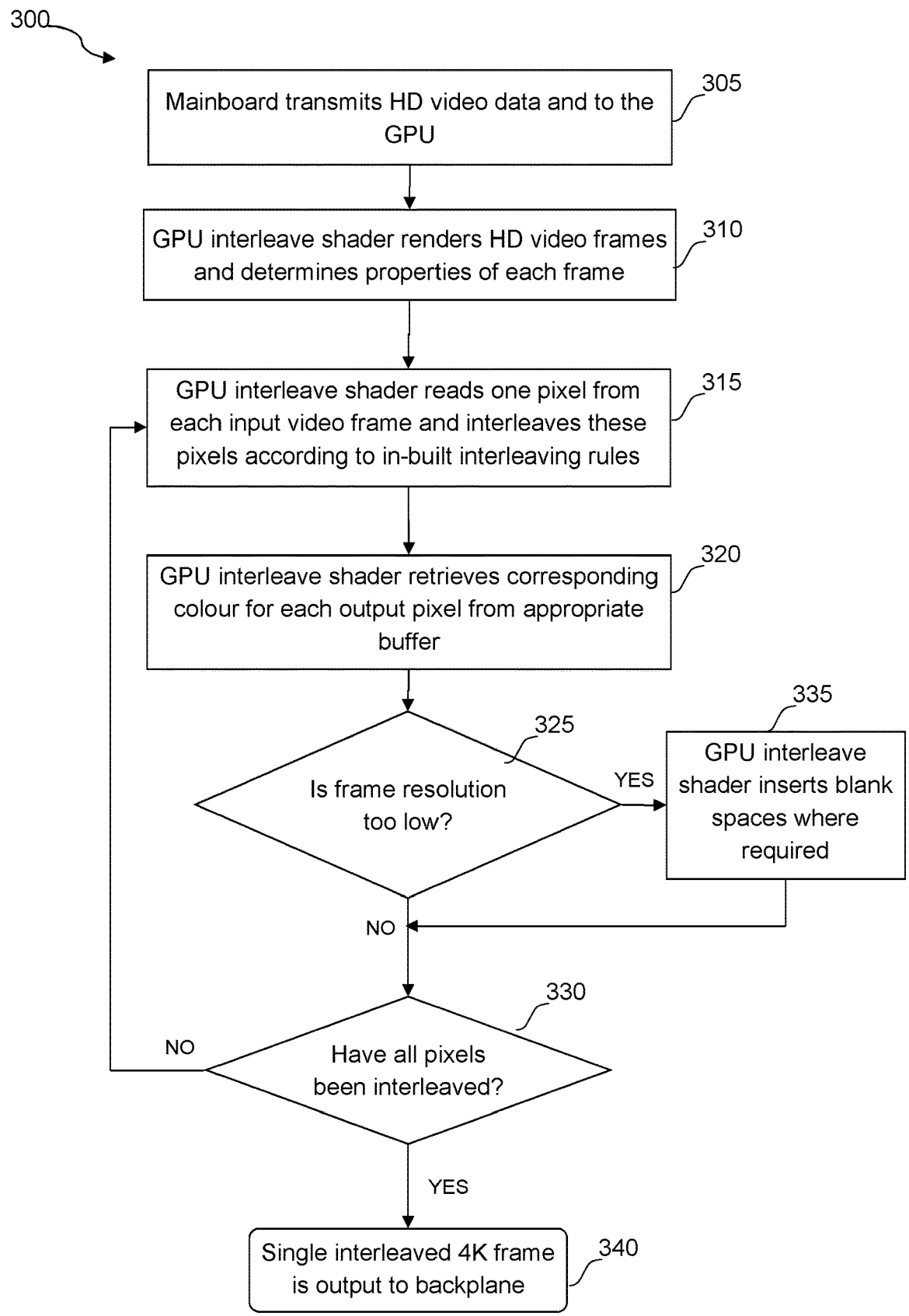
FIG. 5 is a flow diagram of the process of processing and transmitting of video data within the computer comprised within the media server of FIG. 2.

The flow diagram of FIG. 5 illustrates more clearly the steps of the process that is used to manipulate and transmit the video data streams within the computer 20, in those embodiments of the present invention where 4 input HD video data streams are interleaved to form a single output 4K video data stream.

The process 300 begins with Step 305, where the computer mainboard 24 transmits the initial HD video data streams to the GPU 32. As was described with reference to FIG. 2, these initial HD video streams may be generated by the computer mainboard 24 itself; they may alternatively or additionally be received from other sources, via the network 10, using the signal receiver 31 in the computer 20 and retrievably stored in the memory components 28, 32 of the mainboard 24. Notwithstanding how the input video data streams are obtained by the mainboard 24, they are all transmitted at Step 305 to the GPU 32, and thereby to the GPU interleave shader 36.

In Step 310, the GPU interleave shader 36 analyses the input HD video data streams in order to determine certain important properties of each video stream. For example, these properties can comprise the size and resolution of the video stream.

Once the relevant properties of the input video data streams have been determined, before continuing further with the process, the GPU interleave shader 36 may allocate each of the HD video data streams to at least one of a plurality of sub-shaders (not shown) which are compatible with the desired output configuration of the video data streams. For example, certain sub-shaders may support dual-split, quad-split, or mirror output arrangements, and the video data streams will be processed by the corresponding sub-shaders that support the desired output arrangement. Subsequently, it should be understood that all references to the GPU interleave shader 36 performing specific tasks in this process may also be taken to be the allocated sub-shaders performing the same tasks.

Figure 6:
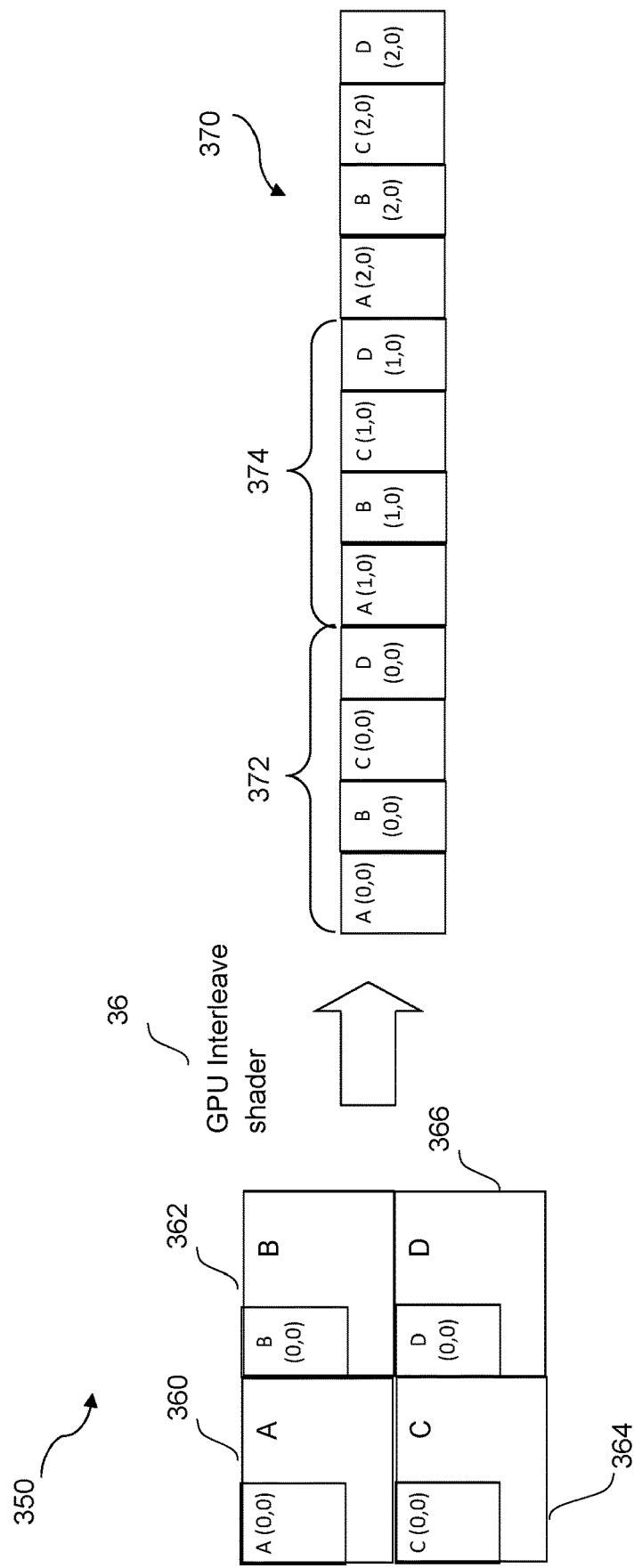
FIG. 6 is a block diagram illustrating the method by which multiple low resolution video data streams are multiplexed into a single higher-resolution output video data stream, according to the process carried out in the system embodiment of FIG. 2.

Subsequently, at Step 315, the relevant sub-shaders of the GPU interleave shader 36 read one pixel from each input HD video data stream in turn, and interleaves these pixels according to predetermined interleaving rules. The details of the interleaving process are illustrated in FIG. 6.

The process 350 begins when 4 input HD video data streams 360, 362, 364, 366 (labelled A, B, C and D respectively in the figure, each of which comprises a plurality of individual pixels), are provided to the GPU interleave shader 36. The pixels from each of the four input streams are read in turn by the GPU interleave shader 36, and interleaved to form a single output stream 370. Using this method, the first pixel of stream A (denoted $A_{0,0}$) corresponds to the first pixel of the output stream 370; the first pixel of stream B (denoted $B_{0,0}$) corresponds to the second pixel of the output stream 370, the first pixel of stream C (denoted $C_{0,0}$) corresponds to the third pixel of the output stream 370; the first pixel of stream D (denoted $D_{0,0}$) corresponds to the fourth pixel of a first sequence 372 of the output stream 370. The second pixel in each of the input streams 360, 362, 364, 366 are then interleaved in a corresponding manner, and the resultant sequence 374 is concatenated with the first sequence of four pixels 372. This process continues until all the pixels from the input streams 360, 362, 364, 366 have been interleaved to produce a single output stream 370.

It should be noted that the interleaving method and resultant ordering of pixels of this embodiment optimises the pixel configuration for producing DVI-format video streams to be output to the network 10. Other interleaving methods and ordering of input pixels may be utilised for other video formats (e.g. 3G-SDI).

Returning to FIG. 6, once the interleaved output stream 370 has been generated, the GPU interleave shader 36 then determines for each output pixel at Step 320 which input stream the pixel was obtained from. Once this has been determined, the GPU interleave shader 36 accesses the input video data stream buffer to obtain the corresponding colour for that pixel, and writes this to a buffer for the output stream so that the information in the input video data streams is not lost in the conversion to a single output stream.

The GPU interleave shader 36 then determines at Step 325 if the resolution of each of the input video data streams is much less than a predetermined threshold resolution (for example, in certain embodiments this threshold resolution may be 1080 pixels). If it is determined in Step 325 that the resolution of all the input video data streams is higher than the predetermined threshold value, the GPU interleave shader 36 then proceeds immediately to determine at Step 330 if all the pixels from the input video data streams have been interleaved.

Alternatively, if it is determined that the resolution of any one of the input video data streams is lower than this threshold value, before proceeding to Step 330, the GPU interleave shader 36 inserts at Step 335 blank spaces or lines in the output video stream so that the data arrives at the VFC cards 22a-d at exactly the right times.

If it is subsequently determined at Step 330 that not all the input pixels have been interleaved, the GPU interleave shader proceeds to repeat Steps 315 to 330, until it is determined at all the pixels from each of the input video data streams have been successfully interleaved. Once this has occurred, the GPU interleave shader 36 outputs to the backplane component 34 at Step 340 a single output 4K video data stream, which has been produced by interleaving the pixels of all four of the HD input video data streams.

In the embodiment with 16 input HD video data streams, four 4K video data streams are generated by the GPU interleave shader 36 using the above-described process of FIGS. 4 and 5. These four 4K video data streams are transmitted to the backplane component 34, which performs line redriving to ensure that the signals do not degrade, and subsequently outputs each of the 4K video data streams to a separate VFC card 22a-d.

Figure 7:
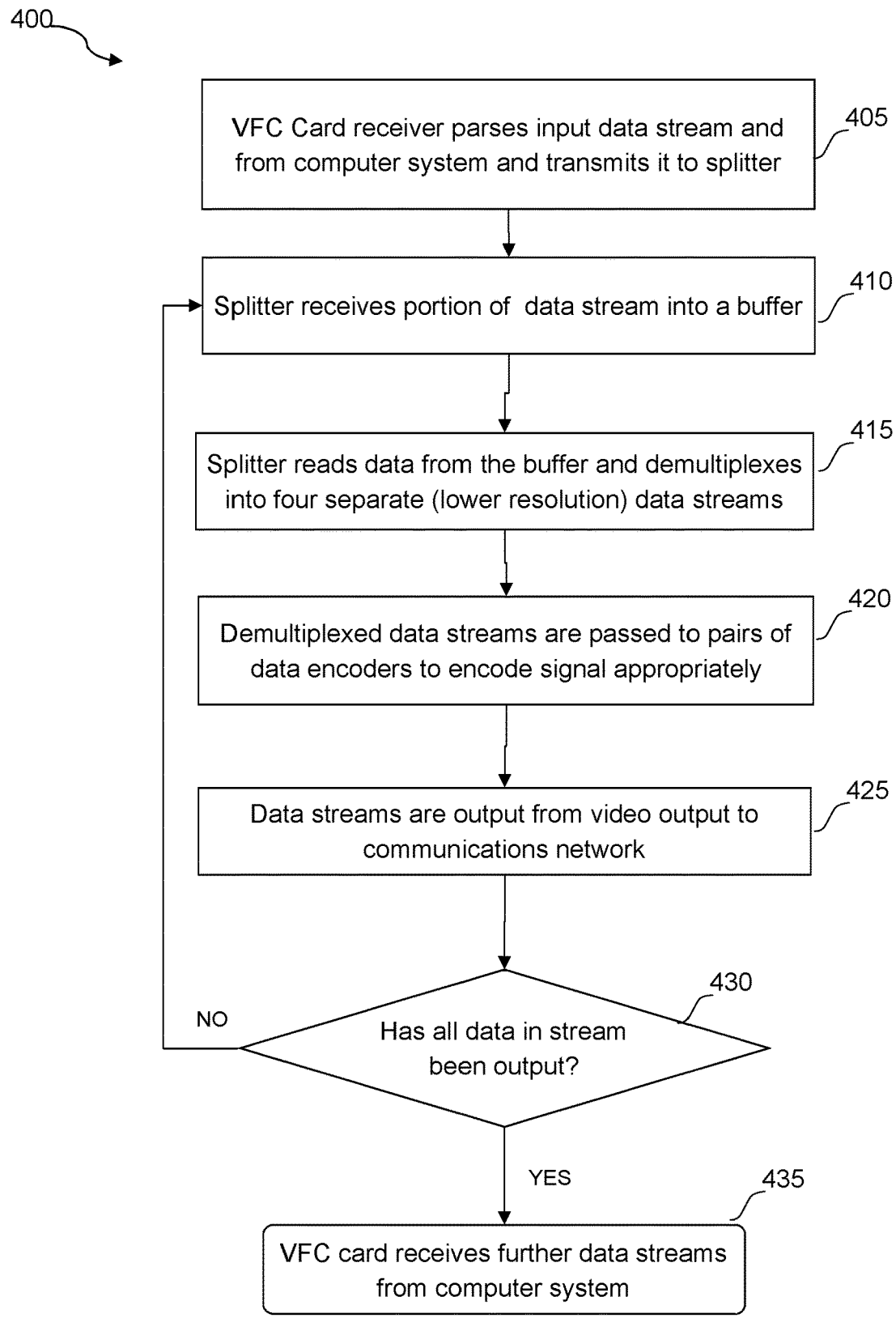
FIG. 7 is a flow diagram of the process of processing and transmitting of video data within the VFC card of FIG. 3.

The flow diagram of FIG. 7 illustrates in greater detail the analysis and manipulation of the input 4K video data stream carried out by each of the VFC cards 22a-d, in order to produce 4 output HD video data streams.

The process 400 begins at Step 405 where the VFC card receiver 50 parses the input 4K video data stream, which was received from the backplane component 34. The input video data stream is then transmitted to the splitter 58, which receives at Step 410 a portion of the input video data stream into a buffer (for example, 10 lines worth of video data, with 4096 pixels in each line), from which the data is retrieved to be processed and output to the network 10.

By receiving the input video data stream into a buffer initially, the splitter builds in a small latency so that it can ensure that any timing differences between the received and output signals can be handled (up to the limit of data that is can be contained within the buffer at any one time). This helps to minimise any latency issues associated with the output of the final HD video data streams.

At Step 415, the splitter 58 reads video stream data from the buffer and demultiplexes the single data stream to produce four HD output video data streams which are sent to the encoder blocks 60a-d in Step 420.

Figure 8:
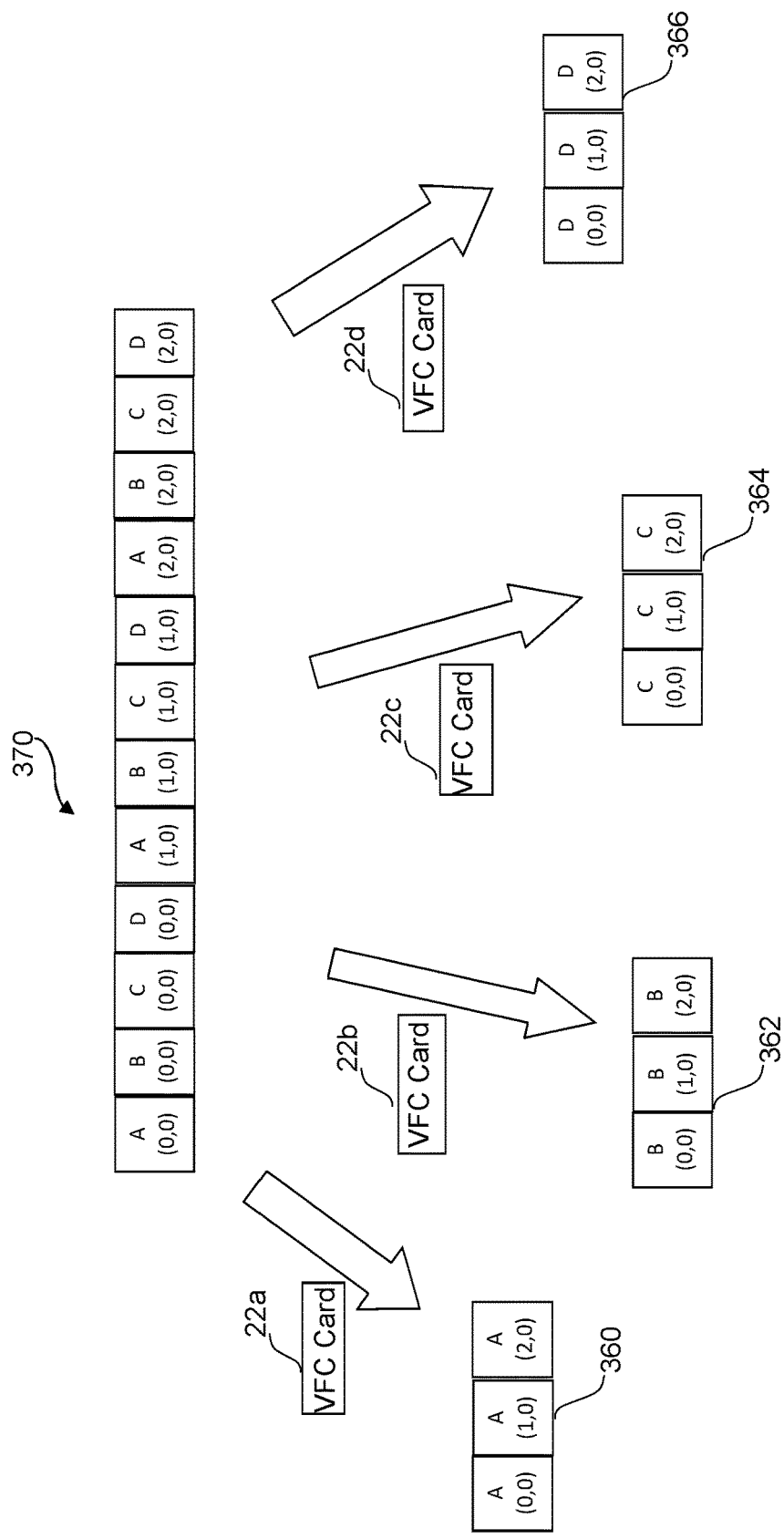
FIG. 8 is a block diagram illustrating the method by which the single high-resolution video data stream generated in FIG. 6 is demultiplexed to form multiple low resolution video data streams, according to the process carried out in the system embodiment of FIG. 2

This is illustrated in greater detail in FIG. 8. Specifically, consecutive pixels from the input 4K video data stream 370 are read by the splitter 58 and sent to separate encoder blocks 60a-d in turn. In other words, pixel $A_{0,0}$ is read and passed to encoder block 60a; pixel $B_{0,0}$ is read and passed to encoder block 60b; pixel $C_{0,0}$ is read and passed to encoder block 60c; and pixel $D_{0,0}$ is read and passed to encoder block 60d. In this manner, the four separate HD video data streams 360, 362, 364, 366 which were provided to the GPU interleave shader 36 in Process 350 are re-generated and passed to the encoder blocks 60a-d for further processing. For completeness, it should be noted that all subsequent pixels from block A (i.e. from video data stream 360) will be passed to the same encoder block 60a; all subsequent pixels from block B (i.e. from video data stream 362) will be passed to encoder block 60b; all subsequent pixels from block C (i.e. from video data stream 364) will be passed to encoder block 60c; and all subsequent pixels from block D (i.e. from video data stream 366) will be passed to encoder block 60d.

Returning to FIG. 7, once the HD video data streams have been received by the encoder blocks 60a-d, they are then processed and encoded at Step 420 into the appropriate format for output to the network 10. Each HD video data stream is then output via a separate video output 54a-d to the network 10, and is subsequently transmitted to a projector 6 for display on a remote display screen 8.

When data has been output to the network 10, the VFC card system processor 62 checks at Step 430 if there is any remaining data in the input 4K video data stream that needs to be output. If it is determined at Step 430 that there is still data remaining in the input video data stream, Steps 410-430 of the process are repeated until a negative result is returned at Step 430. Once a negative result is returned (i.e. the entirety of the input video data stream has been output to the network 10), the VFC cards 22a-d are then able to receive at Step 435 further data streams from the backplane component 34.

It will be appreciated that the above-described embodiment of the present invention has the advantage of reducing the latency period associated with the output of demultiplexed HD video data streams.

Current media server systems attempting to transmit 4 HD video data streams (A, B, C, D) down a single 4K transmission pipeline would arrange the streams into a single input 4K frame, comprising four sub-frames which correspond to the four HD video data streams arranged in a clockwise manner as A, B, D, C. In order to demultiplex the single 4K frame to produce the original four HD streams, such systems would carry out a straightforward raster-type reading of the pixels provided in the input HD video frame. Therefore, in order to generate the four HD video data streams A, B, C, D, and output these streams simultaneously, the system would need to receive and process all the pixels from sub-frames A and B first before receiving any pixels from sub-frames C and D.

In order to output 4 HD video data streams simultaneously, current systems would therefore introduce a latency period for outputting video data streams equivalent to the time required to buffer a full frame. This is undesirable in many instances, particularly in those cases where the output video data streams are transmitted to projectors for display on remote display screens at live events, where real-time updates are important.

Conversely, in the embodiment of the present invention, due to the interleaving process carried out in the backplane component 34, the VFC cards 22a-d are presented with pixels pre-arranged in the optimal order required, such that as soon as the pixels are received, they can be used to generated the four output video data streams immediately, without having to wait for a full frame to be buffered. Latency times are therefore minimised, and can be removed altogether if so desired.

Furthermore, as there is no need to store a full frame prior to output, the method employed in the above-described embodiment of the present invention decreases the memory requirements of the system in which it is implemented.

It should also be noted that the system of the above-described embodiments has the advantage of being flexible. The initial HD video data streams are interleaved in the computer 20, and the VFC cards 22a-d simply demultiplexes the resultant 4K video data stream to produce output HD video data streams, as the industry capabilities are insufficient for transmitting 4K signals within the network 10. However, when the industry capabilities improve and 4K video data may be output from the computer directly to the network 10, all that will be required will be for the VFC cards 22a-d of the present embodiment to be exchanged for VFC cards which output 4K video data, simply providing a 'pass-through' capability, and the correct connections to enable a 4K signal to be output.

In embodiments where the VFC cards take the form of physical cards which may be inserted into a slot in the media server system, a simple exchange of cards is all that is required to change the functionality of the media server system from HD-output, to 4K-output, and even to other resolutions and video formats. For example, it has been envisioned that in the future, the system could also be used with 8K video data streams (or data streams of even higher resolution) when they become more prevalent.

Many modifications may be made to the above examples without departing from the scope of the present invention as defined in the accompanying claims.

The invention claimed is:

1. A media server for generating a first video data stream at a first video resolution and outputting video data to video display devices, the media server comprising:
   an input for receiving a plurality of second video data streams at a second video resolution;
   a video processor card slot for receiving removable video processor cards;
   a processor arranged to interleave pixels of the second video data streams received at the input in order to generate the first video data stream;
   an output arranged to output the first video data stream to the video processor card slot, wherein the video processor card slot comprises a video processor card for outputting video data, the video processor card being arranged for insertion into the media server and into communication with the output of the media server, the card comprising:
     an input for receiving a first video data stream at a first video resolution from the output of the media server;
     a processor arranged to demultiplex the received first video data stream at the first resolution into a plurality of second video data streams, each second video data stream being at a second video resolution; and
     a plurality of video outputs, each video output arranged to output one of the plurality of second video data streams,
     wherein the first video resolution is at a higher video resolution than the second video resolution, and wherein the first video data stream at the first video resolution comprises the plurality of second video data streams interleaved together, such that the media server outputs, via the video processor card, a plurality of second video data streams at the second video resolution.

2. The media server of claim 1, wherein the video processor card slot comprises a pass-through video processor card, the pass-through video processor card being arranged to receive the first video data stream at an input of the video processor card, and to pass the first video data stream through to a video processor card output.

3. The media server of claim 1, wherein the media server comprises at least two video processor card slots.

4. The media server of claim 3, wherein the processor is arranged to generate at least two first video data streams, each first video data stream being sent to a different video processor card slot.

5. A method of generating a first video data stream at a first video resolution and outputting video to video display devices, the method comprising a media server:
   receiving, at an input, a plurality of second video data streams at a second video resolution;
   interleaving pixels of the second video data streams in order to generate the first video data stream; and
   outputting the first video data stream to a video processor card slot for receiving removable video processor cards, the method further comprising a removable video processor card:
   receiving the first video data stream at a first video resolution from the output of the media server;
   demultiplexing the received first video data stream at the first resolution into a plurality of second video data streams, each second video data stream being at a second video resolution; and
   providing a plurality of video outputs, each video output being one of the plurality of second video data streams;
     wherein the first video resolution is at a higher video resolution than the second video resolution, and wherein the first video data stream at the first video resolution comprises the plurality of second video data streams interleaved together.

6. A carrier medium for carrying a computer readable code for controlling a computer device to carry out the method of claim 5.

7. A media server for generating a first video data stream at a first video resolution and outputting video data to video display devices, the media server comprising:
   an input for receiving a plurality of second video data streams at a second video resolution;
   a video processor card slot for receiving removable video processor cards;
   a processor arranged to interleave pixels of the second video data streams received at the input in order to generate the first video data stream;
     an output arranged to output the first video data stream to the video processor card slot
   wherein the first and second video data streams comprise pixel data, and consecutive pixels in the first video data stream comprise pixel data from different ones of the plurality of second video data streams, and wherein each of the second video data streams each represent a different region of a source video split into sub-frames separately output for rendering.

8. The media server of claim 7, wherein the video processor card slot comprises a video processor card for outputting video data, the video processor card being arranged for insertion into the media server and into communication with the output of the media server, the card comprising:

an input for receiving a first video data stream at a first video resolution from the output of the media server;

a processor arranged to demultiplex the received first video data stream at the first resolution into a plurality of second video data streams, each second video data stream being at a second video resolution; and a plurality of video outputs, each video output arranged to output one of the plurality of second video data streams, wherein the first video resolution is at a higher video resolution than the second video resolution, and wherein the first video data stream at the first video resolution comprises the plurality of second video data streams interleaved together, such that the media server outputs, via the video processor card, a plurality of second video data streams at the second video resolution.

9. The media server of claim 7, wherein the video processor card slot comprises a pass-through video processor card, the pass-through video processor card being arranged to receive the first video data stream at an input of the video processor card, and to pass the first video data stream through to a video processor card output.

10. The media server of claim 7, wherein the media server comprises at least two video processor card slots.

11. The media server of claim 10, wherein the processor is arranged to generate at least two first video data streams, each first video data stream being sent to a different video processor card slot.

12. A method of generating a first video data stream at a first video resolution and outputting video to video display devices, the method comprising:

receiving, at an input, a plurality of second video data streams at a second video resolution;

interleaving pixels of the second video data streams in order to generate the first video data stream; and outputting the first video data stream to a video processor card slot for receiving removable video processor cards;

wherein the first and second video data streams comprise pixel data, and consecutive pixels in the first video data stream comprise pixel data from different ones of the plurality of second video data streams, and wherein each of the second video data streams each represent a different region of a source video split into sub-frames separately output for rendering.

13. The method of generating a first video data stream at a first video resolution and outputting video to video display devices as claimed in claim 12, the method further comprising:

receiving a first video data stream at a first video resolution from the output of the media server;

demultiplexing the received first video data stream at the first resolution into a plurality of second video data streams, each second video data stream being at a second video resolution; and providing a plurality of video outputs, each video output being one of the plurality of second video data streams;

wherein the first video resolution is at a higher video resolution than the second video resolution, and wherein the first video data stream at the first video resolution comprises the plurality of second video data streams interleaved together.

\* \* \* \* \*